United States Patent Office 3,176,766
Patented Apr. 6, 1965

3,176,766
SEALING POROUS FORMATIONS
George S. Leachman, Dallas, Tex., and George K. Cleek, Chester, Va., assignors to Allied Chemical Corporation, New York, N.Y., a corporation of New York
No Drawing. Filed July 28, 1961, Ser. No. 127,503
3 Claims. (Cl. 166—33)

This invention relates to sealing porous underground formations permeable to water, referred to in the art as "grouting," and to novel sealing compositions for treatment of the porous underground formation.

The sealing process is useful whenever it is necessary to prevent the ingress of an undesirable fluid, such as ground water, into a well, boring, mine, or any subterranean cavity, or whenever it is necessary to prevent the loss of useful fluids into a porous formation or soil. Common examples are found in the oil well drilling industry where it is often necessary to prevent ground water leakage into the well bore with consequent dilution of the drilling mud, or to prevent loss of drilling mud into porous formation. Subterranean storage of petroleum or petroleum products in natural caverns often requires rendering the reservoir impermeable to ground water and to the stored fluid, a treatment usually referred to as grouting. Similarly, reservoirs and canals often require treatment to prevent loss of liquid into the earth. Frequently it is necessary to inject material around or under the foundations of a building to prevent water leakage or to stabilize the foundation. Other applications are found in mining, underground construction work, and stabilization of sand formations.

Inorganic cements and concretes have been used as sealants for wells and reservoirs, but their heterogeneous nature prohibits their use whenever it is necessary for the sealant to penetrate into a rock formation or soil having fine openings. Such penetration is often necessary in order to obtain complete and permanent sealing against the high hydrostatic pressures encountered in ground water. Various resins have been proposed as sealing compositions, but these materials possess one or more of the following disadvantages: high cost, high viscosity, slow or unpredictable resinification time, especially at low temperatures, poor strength or stability in the presence of water and lack of flexibility to meet varying rock or soil conditions.

Conventional urea-formaldehyde resin suggests itself as a low-cost sealing material, but unfortunately is deficient in several respects. In order to be injected into a porous formation or soil, the sealing material must remain clear and fluid for a sufficient time to permit completion of the injection operation. This time is usually referred to as pumping time. After the soil or formation is impregnated with the sealant, it is desirable that the sealant gel or solidify with as little delay as possible because in most applications pressure must be maintained until the sealant has set up. The time required for gelation or solidification is called gel time. A desirable sealing composition would have a relatively long pumping time preferably about 10 to 30 minutes and a relatively short predictable gel time, 30 minutes to about 2 to 3 hours being satisfactory. In addition the consolidated formation should have water stability and a compressive strength of at least 100 p.s.i.. From the foregoing it will be evident that sealing porous formations is not merely a simple injection of a hardening material and that the prior art compositions achieved only partial success in the sealing of porous formations.

An object of the present invention is to provide an efficient economical process of sealing porous underground formations permeable to water.

Another object of the invention is to provide a low-cost, clear fluid sealant having a viscosity of less than 40 cps., a pumping time of about 10 to 30 minutes, a setting time of about 30 minutes to 3 hours which upon application to porous formation will produce a stable formation having a compressive strength in excess of 100 p.s.i.

A further object is to provide a sealing and stabilizing process employing a composition which may be mixed at prevailing atmospheric temperatures in the range 10 to 40° C. without applying external heat or cooling and employing only ordinary mixing vessels, and which composition may be used to seal porous underground formations within the temperature range of about 10 to 40° C.

A still further object of the invention is to provide a sealing process wherein a composition containing a non-resinous urea-formaldehyde condensate, free formaldehyde and free urea in a mobile state is resinified in situ within the formation to be sealed, to thereby permit deep penetration of the formation prior to solidification and sealing. Other objects and advantages will be apparent from the following description.

The present invention provides a simple, economical means of sealing underground formations or soils. The sealing compositions are initially clear, fluid solutions suitable for injection. In the rock or soil they undergo chemical transformation to form hard, strong, water-insoluble solids, which completely fill the pores of the rock or the soil interstices to form a permanent seal. The sealing composition of the present invention is useful in soils or formations of a noncalcareous nature and has the additional advantage of being useful in formations containing a small amount up to about 2 percent of calcareous material.

In accordance with the present invention these and other objects and advantages are accomplished by impregnating porous formations with a clear mobile non-resinous fluid composition having a pH within the range of about 4 to 6, preferably 4.5 to 5.5 composed of a mixture of 40 to 70 parts, preferably 45 to 65 parts by weight, of a non-resinous urea-formaldehyde condensation product having an average molecular weight within the range of about 120 to 240, preferably an average molecular weight of 140 to 200; 15 to 45 parts, preferably 20 to 40 parts, by weight free formaldehyde; 30 to 60 parts; preferably 35 to 55 parts by weight free urea; about 100 to 160 parts, preferably 1,15 to 145 parts water; and about 3 to about 20 percent by weight of the total of an acid-producing catalyst which is a salt of a strong acid and basic trivalent nitrogen compound containing at least one N–H bond, preferably an ammonium salt of a strong acid, specifically ammonium sulfate and ammonium chloride. It is by this combination of components in defined proportions that the desired advantageous results in grouting operations are obtained. More specifically, one of the most difficult problems in sealing compositions is control of the chemical reactions which cause resinification. Premature resinification would plug the formation and halt injection. To slow resinification would be costly in terms of labor and equipment tie-up, in delay of the well digging or excavation work, or in quantities of material injected, particularly when injecting into strata where flowing water could carry away unresinified fluid. In addition a good sealant should readily penetrate the porous formation. Certain of the sealing compositions suggested in the art are dispersions of solids which have very low penetrating powers with the result that the particles filter out on the surface and form a solid that is only loosely bonded to the formation and easily dislocated by any back pressure from the formation, thus producing only partial plugging, imparting no physical strength to the plugged formation with the result that sloughing or caving-in can readily occur. In the composition of the present invention the combination of components in the defined proportions cooperate to produce a sealant having the desired characteristics for grouting. The composition is a clear liquid of relatively low viscosity generally below 40 cps., preferably below 20 cps. and consequently is easily injectable and can readily penetrate the porous formation. The composition has the desired pumping time of about 10 to 30 minutes during which period it does not become cloudy or too viscous. The composition has a setting time of about 30 minutes to 2 to 3 hours which factor is important because too short a setting time will cause premature plugging and too long a setting time may cause washing away and also increased labor and material costs. The composition sets into a hard permanent solid material, stable against water and which produces a stable formation having a compressive strength in excess of 100 p.s.i.

In co-filed application, entitled "Sealing Calcareous Porous Formations," Serial No. 127,502, is described a new and novel sealing composition particularly adapted for sealing calcareous porous formations. The present sealing composition is particularly adapted to sealing non-calcareous porous formations, although it will successfully consolidate porous formations containing small amounts up to about 2 percent calcareous material. The sealing composition of the present invention is economically advantageous in that a more dilute i.e. lower concentration or lower solids content solution may be employed as compared to the sealing composition of the copending application. The sealing compositions of the copending application preferably contain about 20 to 30 percent water whereas the sealing composition of the present invention preferably contains about 40 to 60 percent water and the water content may be as high as 70 percent. Despite the use of the more dilute sealing composition of the present invention, the compressive strength of the consolidated formation is generally appreciably higher and often is in excess of 1000 p.s.i.

Although urea-formaldehyde resin has been known, no satisfactory method of injecting urea-formaldehyde into porous formations with controlled resinification time has been proposed. This is because of the extreme reactivity of urea-formaldehyde under acidic conditions necessary to cause resinification at ordinary temperatures. Simple acid catalysts do not work. Strong acids cause too rapid resinification, weak acids result in too slow resinification and produce weak, paste-like gels and intermediate acidity causes precipitation which could plug the pores of the formation. In accordance with the present invention these difficulties are overcome by a combination of five ingredients admixed in defined proportions. A non-resinous urea-formaldehyde condensate product having an average molecular weight within the range 120 to 240 and free formaldehyde and free urea are three components. An essential component is a catalyst which is a source of delayed acidity, such catalyst as exemplified by ammonium sulfate reacts with free formaldehyde to produce an essentially neutral compound and cause an increase in acidity as illustrated by the following equation

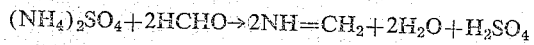
$(NH_4)_2SO_4 + 2HCHO \rightarrow 2NH=CH_2 + 2H_2O + H_2SO_4$

As will be noted the composition has present the necessary free formaldehyde, otherwise the above reaction cannot occur to any degree below 100° F. Mixtures of urea-formaldehyde reaction products in which all of the formaldehyde is chemically combined to urea are therefore not suitable for grouting operations. On the other hand solutions of urea in formalin in which all of the formaldehyde is free formaldehyde are not desirable grouting materials either. Thus, the high mobility and desired setting properties of the sealing composition is dependent on the delayed catalyst, free formaldehyde, urea and the large proportion of the non-resinous urea-formaldehyde reaction product which react slowly with the acid-producing catalyst at temperatures common to underground formations i.e. below 40° C. The amount of catalyst should be at least 3 percent by weight of the composition and because of its delayed action larger amounts up to 15 percent catalyst may be employed without materially affecting the setting time. In soils containing a few percent of calcareous material it is desirable to use larger amounts of catalyst to insure that the acidity generated by the delayed catalyst is adequate to cause resinification. Examples of catalyst suitable for the present invention are ammonium sulfate, ammonium chloride, ammonium phosphate, ammonium oxalate, ammonium nitrate, methylamine hydrochloride and dimethylamine hydrochloride. The composition of the present invention is prepared from readily available low cost material. One method of preparation of the sealing composition of the present invention involves first forming the non-resinous low molecular weight condensation products by reacting urea with a molar excess of formaldehyde, about 4 to 8 mols of formaldehyde per mol of urea, under alkaline conditions, preferably at pH 8 to pH 9, and arresting the reaction when the urea-formaldehyde condensation product has an average molecular weight within the range of 120 to 240, providing sufficient water, free formaldehyde and urea to give a composition containing 40 to 70 parts, preferably 45 to 65 parts by weight non-resinous urea-formaldehyde condensation product having an average molecular weight within the range of 120 to 240; 15 to 45 parts, preferably 20 to 40 parts by weight free formaldehyde; 30 to 60 parts preferably 35 to 55 parts by weight free urea; about 100 to 160 parts, preferably 115 to 145 parts water and adding about 3 to 15 percent by weight of the composition of an acid-producing catalyst of a salt of a strong acid and basic trivalent nitrogen compound containing at least one N–H bond preferably ammonium sulfate or ammonium chloride. In some instances the addition of about 1 to 3 percent by weight of the composition of hexamethylenetetramine is beneficial in that it stabilizes the solution without affecting the final properties of the resin. Reaction to form the non-resinous low molecular weight condensation products is desirably carried out at a temperature within the range of 30° to about 60° C. A relatively short reaction time of about 15 minutes to 2 hours will be adequate for production of the low molecular non-resinous condensation products. Depending upon the ratio of formaldehyde to urea employed in the condensation reaction the resulting solution containing non-resinous condensation products may contain free formaldehyde and free urea which are taken into account in providing the required amounts of these constituents. High ratios result in larger amounts of free formaldehyde which in one case may be adequate to supply the required free formaldehyde content of the final composition. Formaldehyde may be utilized as a 30 to 50 percent aqueous solution. Ordinarily it will be unnecessary to concentrate the solution by removal of water, but if there is excess water it may be removed by vaporization.

The order of mixing the components of the sealing composition may be varied somewhat. That is, the liquid non-resinous urea-formaldehyde reaction product may be mixed with formaldehyde, urea, water in the defined proportions and the catalyst added immediately or within about four hours. Alternatively, the delayed catalyst may be mixed with one of the components of the composition and the other components added immediately before use of the sealant. In both cases, the sealing composition should be used promptly after all components are mixed together. Apparatus used in preparing the sealing composition of the present invention need not be of any specialized type and may be of simple design and construction. Any suitable vessel equipped with mixing means and means for introducing the components and discharging product may be employed. The delayed catalyst is added to the solution just prior to injection into the formation or soil. In order to facilitate mixing, the catalyst is preferably added in the form of aqueous solution. The preferred method of mixing is using a mixing nozzle or proportioning pump so that the solution and catalyst are mixed continuously as they are being injected; however, batch-type mixing may be used. Consolidation of the porous formation is accomplished by forcing the sealing solution of the present invention into the porous formation and maintaining the solution in the pores of the formation until it has been solidified as is conventional in grouting operations.

The following examples illustrate the present invention.

*Example 1*

A liquid non-resinous urea-formaldehyde condensation product was prepared by dissolving urea in a 37 percent aqueous formaldehyde solution in the proportion of one mol urea to 4.9 mols formaldehyde, adding sufficient sodium hydroxide solution to increase the pH to about 9.0 and heating the mixture at a temperature of about 50° C. for about 90 minutes to effect condensation of the urea and formaldehyde to low molecular weight non-resinous reaction products. The reaction product is an aqueous solution containing by weight 25 parts free formaldehyde, 135 parts water, and 60 parts low molecular weight non-resinous condensation products of urea and formaldehyde having an average molecular weight within the range of about 120 to 240, principally a mixture of dimethylolurea, trimethylolurea and tetramethylolurea. To this mixture is added 40 parts urea and then sufficient aqueous ammonium sulfate solution to give 20 weight percent ammonium sulfate in the finished sealing solution. This sealing solution was clear and mobile having a Brookfield viscosity less than 40 cps. at 25° C.

*Example 2*

A 20 mm. O.D. glass tubing, 18 inches in length, was partially filled, as follows, with sections of a very fine silica sand, and mixtures of this sand and powdered limestone. Starting at the bottom, the column was packed with one inch of pure sand, one inch of sand containing 1 percent limestone, another inch of pure sand, and inch of sand containing 1.5 percent limestone, an inch of sand again, followed by an inch of sand containing 2 percent powdered limestone, with the top of the column filled with pure sand except the top four inches which were left empty to serve as a fluid reservoir. The reservoir at the top of the glass column was filled with the sealing solution of Example 1 at 25° C. and one atmosphere of pressure (gauge) applied above the liquid level, forcing the fluid through the column. Within one hour the fluid layer above the sand had hardened completely. After 24 hours the column was cut into sections and the separate layers examined. The pure sand sections were completely hardened and tested at greater than 1000 p.s.i. The 1.0 percent and 1.5 percent limestone zones were also completely hardened and tested at greater than 100 p.s.i. In similar tests with lower catalyst concentrations it was found that the sand sections not containing limestone were always solidified to a hard state with a catalyst concentration as low as about 3 percent. However with small amounts of limestone, less than 2 percent, it was found desirable to increase the catalyst concentration to at least 5 percent preferably 10 percent.

*Example 3*

This example demonstrates large scale use of the process of the invention to consolidate sand containing about 1 percent calcium carbonate or equivalent. The consolidation of the sand was for the purpose of giving a more solid foundation to concrete floors of a large building. In preliminary operation 165 pipes, each 2 inches in diameter were installed to extend several feet vertically into the sand at regular intervals over the area to be consolidated. The volume of grouting fluid to be injected through each pipe was calculated from the distance from other pipes and an estimate of the porosity of the sand.

The sealing solution was similar to that of Example 1 except that ammonium chloride in an amount of 4 percent by weight of the solution was used as the catalyst and 1 percent hexamethylenetetramine was added. The sealing solution was pumped from 55 gallon drums through high-pressure rubber hoses to a mixing head screwed onto the top of the grouting pipes. Injection rates from 2 to 10 gallons per minute were used at pressures ranging up to 50 p.s.i.g. There was no difficulty with resin forming in the pipes during pumping. Solution temperatures averaged about 25° C. Core samples of the sand showed good solidification within 24 hours from time of pumping. Vibration measurements before and after the grouting operation also indicated that the sand had been well consolidated to give an improved foundation.

Although certain preferred embodiments of the invention have been disclosed for purpose of illustration, it will be evident that various changes and modifications may be made therein without departing from the scope and spirit of the invention.

We claim:

1. A method of sealing porous underground formations whereby the compressive strength is greater than 100 p.s.i., the pumping time is about 10 to about 30 minutes and the gel time is about 30 minutes to about 3 hours which comprises impregnating the porous formation with a clear mobile non-resinous fluid composition composed of a mixture of 40 to 70 parts by weight of a non-resinous urea-formaldehyde condensation product having an average molecular weight within the range of about 120 to 240; 15 to 45 parts by weight free formaldehyde; 30 to 60 parts by weight free urea; about 100 to 160 parts water; and about 3 to about 20 percent by weight of the total composition of an acid producing catalyst which is a salt of a strong acid and basic trivalent nitrogen compound containing at least one N–H bond, said mixture having a pH of about 4 to 6.

2. A method as claimed in claim 1, wherein said composition contains up to about 3 percent by weight hexamethylenetetramine.

3. A method of sealing porous underground formations whereby the compressive strength is greater than 100 p.s.i., the pumping time is about 10 to about 30 minutes and the gel time is about 30 minutes to about 3 hours which comprises impregnating the porous formation with a clear mobile non-resinous fluid composition composed of a mixture of 45 to 65 parts by weight of a non-resinous urea-formaldehyde condensation product having an average molecular weight within the range of about 140 to 200; 20 to 40 parts by weight free formaldehyde; 35 to 55 parts by weight free urea; about 115 to 145 parts water; and about 3 to about 20 percent by weight of the total composition of an acid producing catalyst which is a salt of a strong acid and basic trivalent nitrogen compound containing at least one N–H bond, said mixture having a pH of about 4.5 to 5.5.

References Cited by the Examiner

UNITED STATES PATENTS

| | | | |
|---|---|---|---|
| 1,718,901 | 6/29 | Gams et al. | 260—69 |
| 1,790,461 | 1/31 | Cherry | 260—69 |
| 2,096,521 | 10/37 | Kraus et al. | 260—69 |
| 2,562,867 | 7/51 | Kurtz et al. | 166—33 |
| 2,625,524 | 1/53 | Kvalnes | 260—69 X |

CHARLES E. O'CONNELL, *Primary Examiner.*